United States Patent [19]
Easley

[11] Patent Number: 5,486,757
[45] Date of Patent: Jan. 23, 1996

[54] WHEEL-SPEED SENSORS FOR MOTOR VEHICLE MOUNTED IN THE SPREADER HOLES OF A DIFFERENTIAL CARRIER HOUSING

[75] Inventor: Paul D. Easley, Auburn, Ind.

[73] Assignee: Dana Corporation, Toledo, Ohio

[21] Appl. No.: 111,125

[22] Filed: Aug. 24, 1993

[51] Int. Cl.⁶ .............................. G01P 3/48; G01P 3/52; F16H 1/38; B23P 11/00
[52] U.S. Cl. ............................ 324/174; 475/150; 29/434
[58] Field of Search .................................... 324/173, 174, 324/207.22, 207.25, 226, 262; 475/150, 160; 180/197; 188/181 A, 181 R; 29/434

[56] References Cited

U.S. PATENT DOCUMENTS

| | | | |
|---|---|---|---|
| 3,138,970 | 6/1964 | Costa et al. ................................. | 74/711 |
| 3,189,890 | 6/1965 | Gilbert et al. ............................. | 340/347 |
| 3,719,841 | 3/1973 | Ritsema .................................... | 310/155 |
| 3,769,533 | 10/1973 | Pauwels .................................. | 310/155 |
| 3,905,089 | 9/1975 | Osenbaugh et al. ...................... | 29/434 |
| 4,683,775 | 8/1987 | Hilker et al. .............................. | 74/710 |
| 4,922,197 | 5/1990 | Juds et al. ............................ | 324/207.21 |
| 5,224,259 | 7/1993 | Rode ....................................... | 29/598 |

*Primary Examiner*—Walter E. Snow
*Attorney, Agent, or Firm*—Oldham & Oldham Co.

[57] ABSTRACT

The invention relates a speed-sensing system to monitor the speed of individual wheels of a vehicle. A vehicle axle including a carrier housing and differential case assembly rotatably mounted within said carrier housing includes speed-sensing equipment associated with the carrier. The carrier housing has axle tubes extending therefrom in which axle shafts for the vehicle are disposed. The axle shafts are drivingly coupled to the case assembly and each includes a signal generator thereon. A sensing device is mounted in spreader holes in the carrier housing and positioned relative to the signal generator to monitor the rotary motion of the shaft and generate a signal which can be used by an onboard computer to control the speed of the axle shaft for the individual wheel of the vehicle. There is further described a method of assembling an axle assembly for a vehicle having a wheel speed sensor.

15 Claims, 2 Drawing Sheets

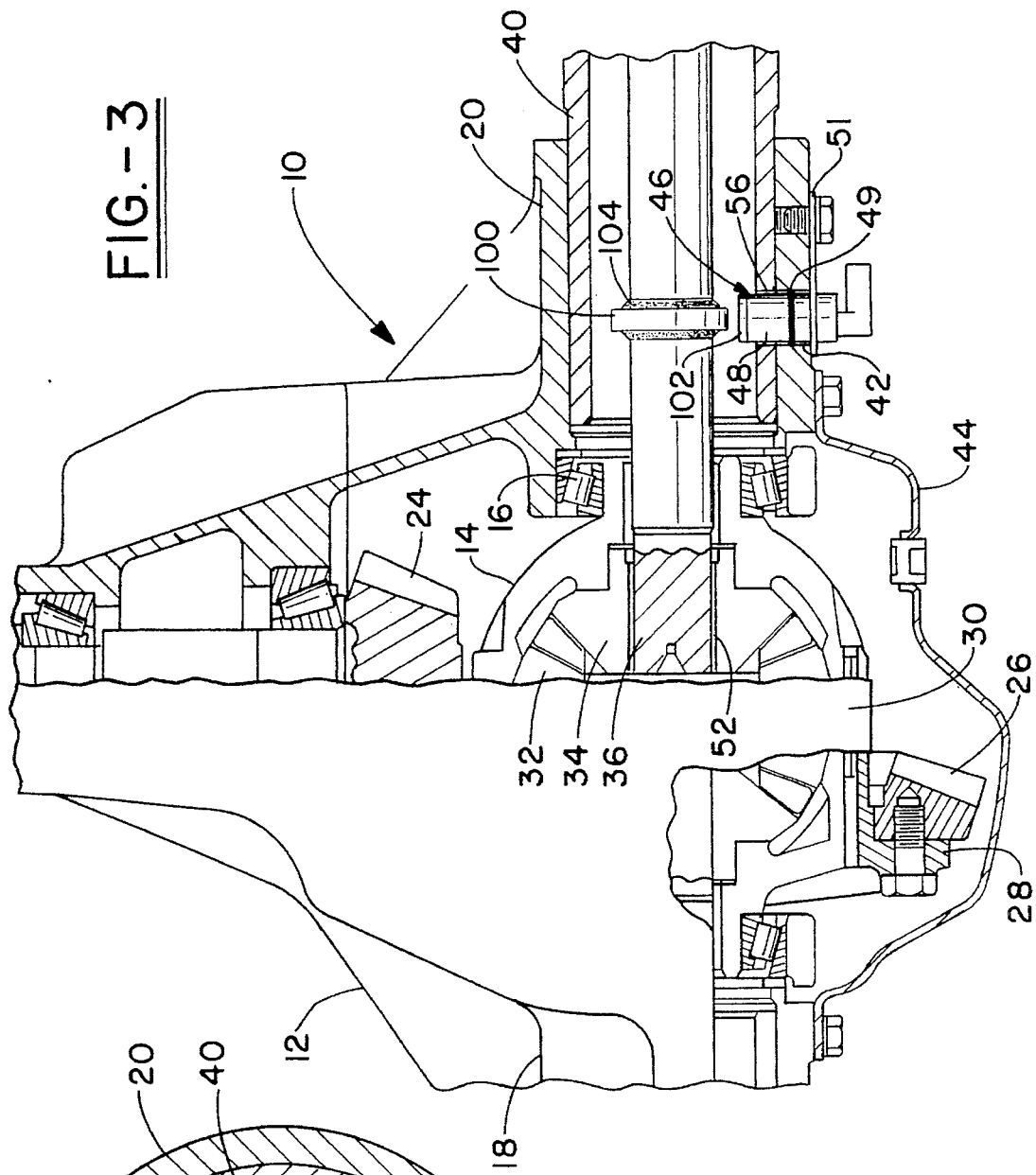
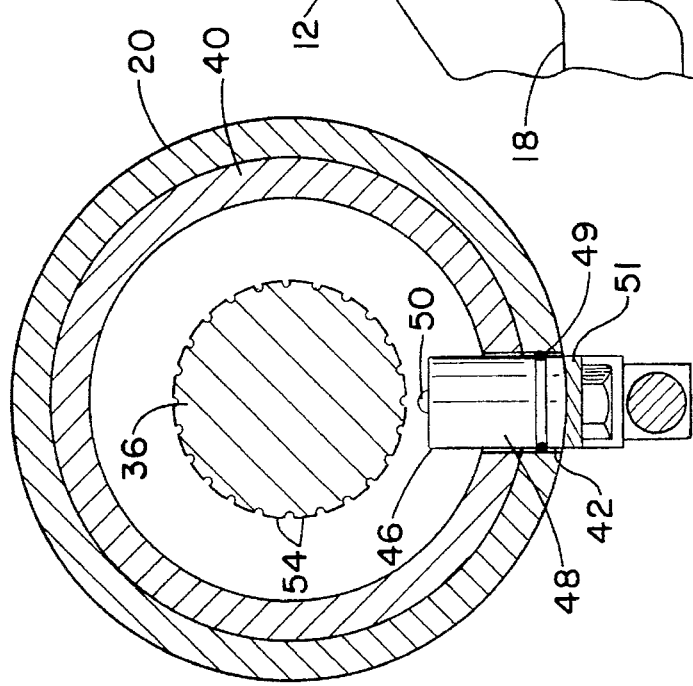

WHEEL-SPEED SENSORS FOR MOTOR VEHICLE MOUNTED IN THE SPREADER HOLES OF A DIFFERENTIAL CARRIER HOUSING

BACKGROUND OF THE INVENTION

This invention generally relates to a motor vehicle wheel-speed sensor utilized to monitor the speed of each individual wheel of the vehicle and transmit data to an onboard computer for activation of systems to control wheel speed.

There are numerous prior art vehicle axle assemblies which provide speed-sensing devices associated therewith for antilock braking systems or traction control as examples. In such systems, speed-sensing equipment is conventionally located at the ring-gear flange of the differential assembly or directly affixed to a trunnion extending from and being integral with the ring gear flange. The speed-sensing equipment normally comprises an exciter wheel or tone wheel secured to the ring-gear flange which includes a plurality of toothed elements thereon. Such a system has various disadvantages including extra tooling for machining the additional components, such as the tone wheel. These components are also subject to seating problems in assembly. It has also been found that the resolution of these speed-sensing systems is less than desirable, particularly at low speeds.

SUMMARY OF THE INVENTION

The invention provides a speed-sensing system associated with a vehicle axle assembly and the method of assembling the axle which eliminates separate components or simplifies manufacture to result in lower production costs. The speed-sensing system is also located in a protected environment to reduce the possibility of contamination or corrosion of the system.

The invention relates to a speed-sensing system to monitor the speed of individual wheels of a vehicle comprising a vehicle axle including a differential carrier housing and case assembly rotatably mounted within said carrier housing. The carrier housing includes an axle tube extending therefrom in which an axle shaft for the vehicle is disposed. The axle shaft is drivingly coupled to the case assembly and has a signal generating means disposed adjacent to the carrier housing and formed integrally in the shaft or as a separate component secured to the shaft. A sensing device is mounted in association with the carrier housing and positioned relative to the signal generator on the axle shaft to monitor the rotational speed of the shaft and generate a signal which can be used by an onboard computer to control the speed of each individual wheel of the vehicle. The invention further includes a method of assembling a vehicle axle assembly having a wheel-speed sensor which comprises the steps of providing a differential carrier housing having annular trunnion flanges associated therewith, and machining spreader holes in the housing at predetermined locations. The carrier housing is spread at the location of the spreader holes and the differential case is inserted into the carrier and rotatably supported by means of bearing assemblies. Extending outwardly from each of the annular trunnion flanges is an axle tube placed in mating and axially-overlapping relationship with each annular trunnion flange. Within the axle tube, there is machined an additional hole which during assembly is aligned with the spreader hole formed in the carrier housing. Axle shafts may then be inserted through the axle tubes and into driving engagement with the gears of the differential case. The axle shaft has a signal generating means provided thereon, comprising in embodiments either integrally formed teeth or a ring secured to the shaft. A transducer is mounted in association with the carrier housing through the spreader hole and additional hole formed in the axle tube to be positioned relative to the signal generating means on the axle shaft to monitor the rotational speed thereof and generate a signal which can be used to control the speed of the axle shaft.

BRIEF DESCRIPTION OF THE DRAWINGS

The objects and advantages of the invention will become apparent upon a further reading of the detailed description in conjunction with the drawings, wherein:

FIG. 2 is a cross-sectional view taken along line 2—2 in FIG. 1; and

FIG. 3 is a partial cross-sectional view of an alternative embodiment.

DETAILED DESCRIPTION OF THE DRAWINGS

Figure 1:
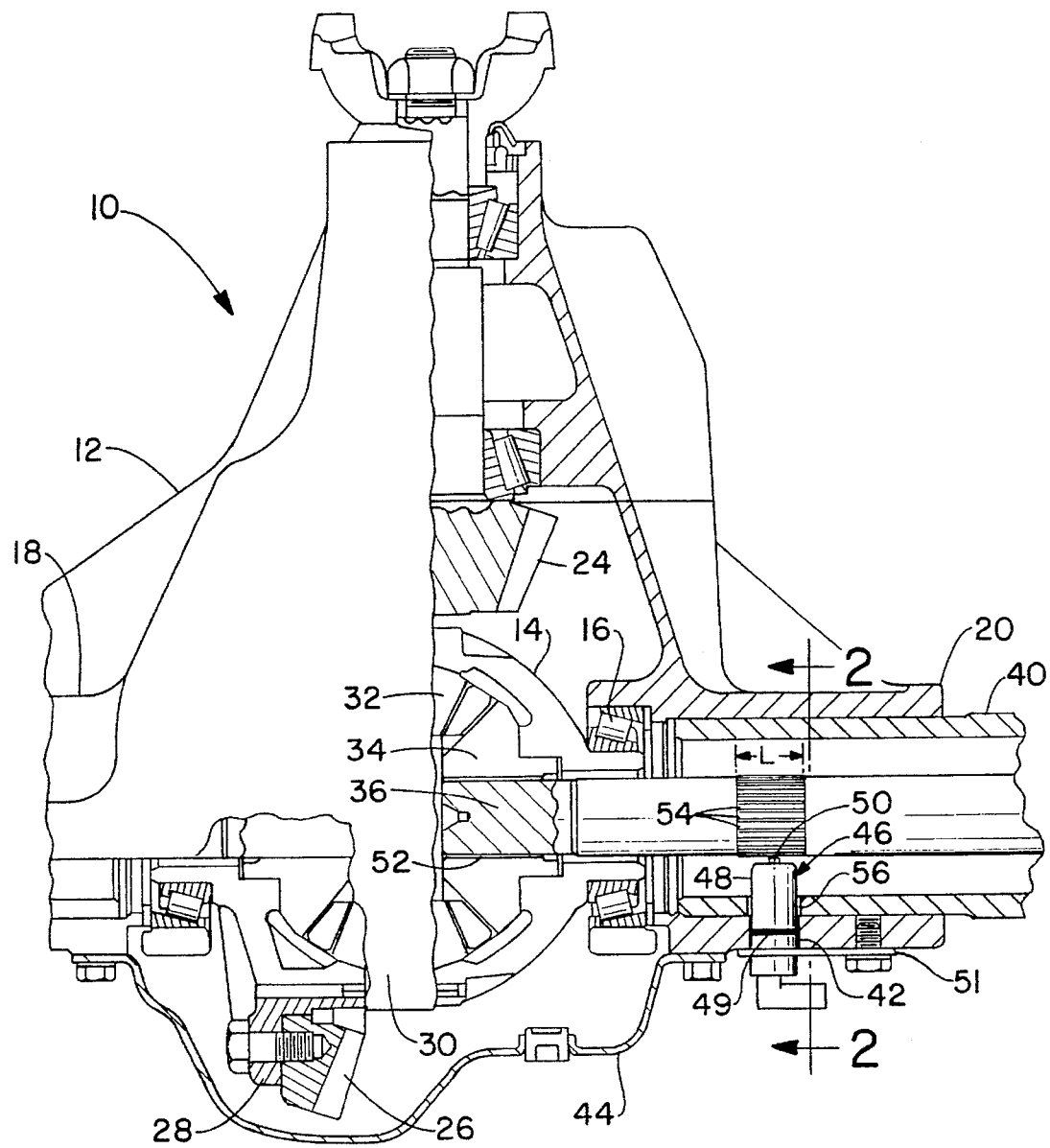
FIG. 1 is a partial cross-sectional view of a differential axle assembly incorporating a speed-sensing system in accordance with the invention.

Referring to FIGS. 1 and 2, a first embodiment shows an axle assembly 10 including a cast iron external housing or carrier 12 which is supported on a vehicle. The carrier 12 rotatably supports a differential case by means of a pair of bearings 16 which are housed within a pair of axially-extending annular trunnion flanges 18 and 20.

Within the case 14 is supported a differential gear set for imparting rotary motion from an input drive shaft to the vehicle axle shafts. The drive axle includes a drive pinion gear 24 which is in constant mesh with a ring gear 26 bolted to a ring gear flange 28. In known speed-sensing mechanisms associated with a differentiating axle assembly, there may be mounted a separately machined tone ring (not shown) which is press fit onto the ring gear flange 28. In such a system, the tone ring includes a plurality of machined teeth therein, and a speed sensor is arranged to extend through the differential carrier 12 so as to be adjacent the position of the tone ring on the ring-gear flange. As previously mentioned, such an arrangement requires additional parts, extra tooling and machining, and causes potential seating problems for the extra parts as well as increased runout causing transducer-sensing problems. Tolerances can also be a effected by bending distortions of the ring gear under various dynamic load conditions. In the speed-sensing system of the invention, a tone ring positioned on the ring gear flange is eliminated and the speed-sensing equipment is specially placed to avoid such problems.

The differential case 14 also houses a cross shaft 30 which in turn supports a pair of rotatable differential pinion gears 32 engaging differential side gears 34 for rotation therewith. The side gears 34 are splined to left and right axle shafts 36, respectively, with only the right-hand side of the axle assembly being shown in the drawings. Differential rotary speeds are imparted to the axle shafts 36 by conventional means. Other known configurations for use in an axle assembly of similar type may also be incorporated as desired.

Before assembly of the axle shafts 36, a pair of steel axle tubes 40 are coupled with the annular trunnion flanges 18 and 20 by conventional means. The axle shafts 36 may then be inserted through axle tubes 40 into driving engagement with the side gears 34 provided in differential case 14.

In the differential housing 12, spreader holes 42 are machined into the annular trunnion flange 18 or 20 at a position adjacent the location of an access coverplate 44 secured to the carrier 12. The spreader holes 42 allow insertion of a tool to effect spreading of the carrier 12 for insertion of the differential case 14 into carrier 12. The spreader holes 42 are precisely-machined manufacturing holes used in assembly of a conventional axle, and are used in the present invention to give access to the interior of carrier 12 for placement of a speed-sensing transducer 46. The speed-sensing transducer 46 also extends through a precisely machined corresponding hole 56 in the axle tube 40, which when assembled in the annular trunnion flange 18 or 20 will be aligned with the spreader hole 42.

The speed-sensing transducer 46 includes a sensor body 48 from which extends a transducer pickup 50. The transducer pickup 50 is positioned closely adjacent to the axle shaft 36 of the differential axle assembly 10. The speed-sensing transducer 46 may include an o-ring or other suitable seal 49 positioned in a groove on the body of transducer 46. The seal 49 engages the side walls of spreader hole 42 to prevent oil leakage from the axle assembly 10. Transducer 46 is rigidly held in position in association with the carrier 12 by means of a bracket 51 which is bolted onto the annular trunnion flange 18 or 20. The bracket 51 may also be secured by other conventional means. The speed-sensing transducer 46 is preferably installed on both sides of the differential axle assembly 10 to separately monitor the rotational speeds of both the right and left axle shafts 36, and thereby monitor left and right wheel speeds independently. In this way, the speed information may be used to activate systems to control wheel speed for traction control or in antilock brake systems.

In this embodiment of the invention, the speed-sensing transducer 46 may be a variable reluctance transducer positioned in close proximity to a signal generating means which in this embodiment would comprise a plurality of uniformly-spaced projections or teeth 54. The teeth 54 are integrally formed on the axle shaft 36 at a location adjacent the speed-sensing transducer 46. The teeth 54 provide a signal generator for the transducer 46 to allow measurement of the rotational speed of the axle shaft 36 as will be appreciated by those skilled in the art. The transducer 46 will produce an electrical output supplied to an electronic control circuit (not shown) which is used to control the rotational speed of the axle shaft 36 as desired. In manufacture of the axle shaft 36, both the splines 52 and the teeth 54 may be produced in a single, one-pass manufacturing process conveniently and cost effectively. The teeth 54 have a length L, being up to 1 1/2 inches to provide consistent monitoring of axle rotational speed while allowing for axial end-play of each of the axle shafts 36 during operation of the vehicle.

In the preferred embodiment, the speed-sensing differential axle assembly is advantageous in that the speed-sensing transducer 46 is located in a protected environment within the axle tube 40. In this configuration, there is less possibility of contamination or corrosion of components for more reliable operation. Additionally, the access hole for the speed-sensor assembly already exists in the carrier housing 12 in the form of the spreader hole 42 and only additional hole 56 in the axle tube 40 requires further machining.

Turning now to FIG. 3, an alternative embodiment shows the use of a different signal generating means used in association with the axle shafts 36 to allow the rotational speed thereof to be accurately monitored. In this embodiment, a bipolar ring magnet 100, may be secured to the axle shafts 36 at a position outboard of splines 52 formed on shaft 36. Upon rotation of shaft 36, the bipolar ring 100 will rotate relative to the speed-sensing transducer 102, which in this embodiment may be a Hall-effect sensor positioned adjacent ring magnet 100 in a manner similar to that described with reference to the embodiment of FIGS. 1 and 2. The bipolar ring magnet 100 may comprise a ring shaped piece of magnetic material with pole pairs magnetized around its circumference. The pole pairs formed on the ring magnet 100 will generate a variable magnetic field upon rotation with axle shaft 36, with the number of pole pairs determining the resolution of the speed-sensing system. The ring magnet 100 may be formed completely of magnetic material or by a process as described in U.S. Pat. No. 5,224,259 or any other suitable technique. To secure the bipolar ring magnet 100 to axle shaft 36, a knurl 104 may be rolled on shaft 36 to increase the diameter of the shaft for press fitting of the bipolar ring magnet 100 thereon. In this way, the bipolar ring magnet 100 may be inserted over the raised area of splines 52, and then press fit on the raised knurl 104 for proper positioning. The use of a bipolar ring magnet 100 as a signal generator for the speed-sensing system may allow better resolution of rotational speeds of the axle shafts 36, particularly at lower speeds.

In assembly of the vehicle axle, the carrier housing 12 has two spreader holes 42 machined at predetermined spaced positions on the carrier housing 12. A tool is used to spread the carrier housing to allow insertion of the differential case 14 into the carrier housing 12. Axle tubes 40 are coupled to the housing 12 at the location of the respective annular trunnion flanges 18 and 20. The corresponding hole 56 is machined into each axle tube 40 such that each hole 56 will be aligned with a respective spreader hole formed in the housing 12. Axle shafts 36, provided with signal generating means thereon, are inserted through the axle tubes 40 into engagement with side gears of the differential case. The speed-sensing transducer 46 is thereafter inserted through the spreader hole 42 and corresponding hole 56 formed in axle tube 40 to a position adjacent the signal generating means. In this position, the speed-sensing transducer 46 can monitor the rotational speed of the axle shaft 36 to generate a signal which can be used to control the speed of the axle shafts.

Although presently-preferred embodiments have been shown and described herein, the following claims are intended to cover numerous alternative embodiments or modifications which fall within the spirit and scope of the invention and are not to be limited by the particular embodiments described.

What is claimed is:

1. A speed-sensing system to monitor the speed of individual wheels of a vehicle, comprising, a vehicle drive axle including a differential carrier housing and case assembly rotatably mounted within said carrier housing, said carrier housing having first and second axle tubes coupled to and extending therefrom in which first and second axle shafts for said vehicle are disposed, said carrier housing having spreader holes formed therein at each location where said axle tubes are coupled to said carrier housing, wherein each of said axle shafts are drivingly engaged to said case assembly and includes signal generating means associated therewith, and a sensing device mounted in said carrier housing at the location of said spreader holes and adjacent to said signal generating means to independently monitor the rotation of each of said axle shafts to generate a signal proportional to the speed of said axle shaft.

2. The speed-sensing system of claim 1, wherein, said signal generating means is a plurality of integrally formed teeth on said axle shaft positioned at a location adjacent said case assembly.

3. The speed-sensing system of claim 1, wherein, said plurality of teeth have sufficient length to accommodate axial end-play of the axle shaft while maintaining the position of said sensing device adjacent thereto.

4. The speed-sensing system of claim 1, wherein, said spreader hole is formed in an annular trunnion flange associated with said carrier housing, and said at least one axle tube includes a corresponding hole therein, with said corresponding hole positioned in alignment with said spreader hole such that said sensing device is positioned through said spreader hole and said corresponding hole to said position adjacent said signal generating means.

5. The speed-sensing system of claim 1, wherein said sensing means is an electronic pick-up which is totally enclosed within said axle tube at a location adjacent said case assembly.

6. The speed-sensing system of claim 1, wherein, said first and second axle tubes are coupled to and extended from a pair of annular trunnion flanges associated with said carrier housing, with said spreader holes formed in said annular trunnion flanges.

7. The speed-sensing system of claim 1, wherein, said sensing means is an electronic transducer having a body portion which extends through said spreader hole and through a corresponding hole formed in said axle tubes to extend to a position adjacent to said axle shaft in close proximity to said case assembly, said body portion including a sealing means to seal each of said holes and prevent leakage of fluids from said carrier housing.

8. The speed-sensing system of claim 1, wherein, said signal generating means is a bipolar ring magnet secured to said axle shaft.

9. The speed-sensing system of claim 8, wherein, said bipolar ring magnet is press fit onto a raised portion of said axle shaft at said predetermined position.

10. The speed-sensing system of claim 1, wherein, said sensing means is a Hall-effect sensor enclosed within said axle tube so as to be protected from the external environment.

11. A method of assembling a vehicle axle having a wheel-speed sensor associated therewith, comprising the steps of:

(1) providing a differential carrier housing having a pair of annular trunnion flanges, (2) machining a pair of spreader holes in said carrier housing at predetermined locations;

(3) spreading said carrier housing via said spreader holes and inserting a differential case into said carrier housing which is rotatably supported within said housing by means of bearing assemblies, (4) providing a pair of axle tubes having a corresponding hole formed at a predetermined position therein, and securing said axle tubes with said annular trunnion flanges such said each of said corresponding holes will be aligned with said spreader holes respectively, (5) inserting a speed-sensing means through each of said spreader holes and corresponding holes, and (6) assembling an axle shaft through each of said axle tubes and into driving engagement with said differential case, said axle shafts having a signal generating means at a location coinciding with the position of said speed-sensing means within each of said axle tubes such that said speed-sensing means will generate a signal proportional to the rotational speed of each of said axle shafts.

12. The method of assembling an axle assembly as in claim 11, wherein, said signal generating means is a plurality of integrally formed teeth on said axle shafts.

13. The method of assembling an axle assembly as in claim 12, wherein, said axle shafts have an end portion provided with splines for engagement with said differential case, and said teeth are formed in a one-pass procedure with the formation of said splines.

14. The method of assembling an axle assembly as in claim 11, wherein, said signal generating means is a bipolar ring magnet secured to said axle shafts.

15. The method of assembling an axle assembly as in claim 14, wherein, said axle shafts have an end portion with raised splines formed therein for engagement with said differential case, with said bipolar ring magnet being inserted over said raised splines and being press fit onto a raised portion formed outward of said splines on each of said axle shafts.

* * * * *